US012767073B2

(12) United States Patent
Liu et al.

(10) Patent No.: US 12,767,073 B2
(45) Date of Patent: Oct. 20, 2026

(54) METHODS OF JOINING MULTILAYER COPPER-GRAPHENE COATED CURRENT COLLECTORS TO BATTERY CANS AND BETWEEN WINDINGS IN ELECTRIC MOTOR STATORS

(71) Applicant: GM Global Technology Operations LLC, Detroit, MI (US)

(72) Inventors: Yi Liu, Troy, MI (US); Huaxin Li, Rochester Hills, MI (US); Qigui Wang, Rochester Hills, MI (US); Kestutis A. Sonta, Troy, MI (US); Masoud MohammadPour, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 240 days.

(21) Appl. No.: 18/545,372

(22) Filed: Dec. 19, 2023

(65) Prior Publication Data

US 2025/0196790 A1 Jun. 19, 2025

(51) Int. Cl.
*B60R 16/033* (2006.01)
*B23K 26/322* (2014.01)
(Continued)

(52) U.S. Cl.
CPC .......... *B60R 16/033* (2013.01); *B23K 26/322* (2013.01); *H01B 7/0018* (2013.01);
(Continued)

(58) Field of Classification Search
CPC .......... H01B 1/026; H01B 1/04; H01B 7/208; H01B 7/0018; H01R 13/03; H01R 4/04;
(Continued)

(56) References Cited

U.S. PATENT DOCUMENTS 5,048,744 A * 9/1991 Chang .................. B23K 35/001 228/123.1
2007/0290373 A1* 12/2007 Reinold ................. H01R 13/03 257/784
(Continued)

FOREIGN PATENT DOCUMENTS

CN 103811095 A * 5/2014 ............... H01B 1/02
CN 105261723 A * 1/2016 .......... H01M 50/528
(Continued)

OTHER PUBLICATIONS

Tu et al., Nanostructure diffraction analysis of a copper/single walled carbon nanotube nanocomposite synthesized by Laser Surface Implanting, Carbon, vol. 113, 2017, pp. 1-9, Science Direct, United States.
(Continued)

*Primary Examiner* — Oluseye Iwarere
*Assistant Examiner* — Daniel K Schlak
(74) *Attorney, Agent, or Firm* — Vivacqua Crane, PLLC

(57) ABSTRACT

An electrical connection for a vehicle and methods of forming an electrical connection for a vehicle. The electrical connection includes a first electrical component including a first joining area. The electrical connection also includes a conductor including a second joining area. The conductor is joined at the second joining area to the first joining area of the first electrical component. In addition, the electrical connection includes a fusion zone formed in the first electrical component in the first joining area. The conductor includes a copper-graphene multilayer composite formed on the surface of the conductor, the composite including at least one of the following composite structures: a) alternating layers of graphene and copper deposited on the substrate, b) graphene particles dispersed in a copper matrix, and c) alternating layers of graphene and copper deposited on a
(Continued)

copper foil, wherein the copper foil is wrapped around the substrate.

20 Claims, 4 Drawing Sheets

(51) Int. Cl.

| | |
|---|---|
| ***H01B 7/00*** | (2006.01) |
| ***H01B 7/20*** | (2006.01) |
| ***H01M 50/507*** | (2021.01) |
| ***H01M 50/516*** | (2021.01) |
| ***H01M 50/522*** | (2021.01) |
| ***H01M 50/526*** | (2021.01) |
| ***H01M 50/562*** | (2021.01) |
| ***H01R 4/02*** | (2006.01) |
| ***H01R 4/04*** | (2006.01) |
| ***H01R 13/03*** | (2006.01) |
| ***H01R 43/02*** | (2006.01) |
| ***H02K 3/50*** | (2006.01) |
| *H02K 15/32* | (2025.01) |

(52) U.S. Cl.
CPC .......... *H01B 7/208* (2013.01); *H01M 50/507* (2021.01); *H01M 50/516* (2021.01); *H01M 50/522* (2021.01); *H01M 50/526* (2021.01); *H01R 4/029* (2013.01); *H01R 4/04* (2013.01); *H01R 13/03* (2013.01); *H02K 3/50* (2013.01); *H01M 50/562* (2021.01); *H01R 43/0207* (2013.01); *H01R 43/0221* (2013.01); *H01R 2201/26* (2013.01); *H02K 15/32* (2025.01); *H02K 2203/09* (2013.01)

(58) Field of Classification Search
CPC ........................... H01R 4/029; H01R 43/0221; H01R 43/0207; H01R 2201/26; H01M 50/507; H01M 50/516; H01M 50/562; H01M 50/522; H01M 4/667; B23K 26/322
See application file for complete search history.

(56) References Cited

U.S. PATENT DOCUMENTS

| | | | | |
|---|---|---|---|---|
| 2008/0131765 | A1* | 6/2008 | Imanaga | H01M 50/51 219/127 |
| 2010/0255361 | A1* | 10/2010 | Wu | H01M 50/562 429/121 |
| 2012/0292294 | A1* | 11/2012 | Oda | B32B 15/012 219/118 |
| 2013/0189560 | A1* | 7/2013 | Widhalm | H01M 50/581 29/623.5 |
| 2015/0099152 | A1* | 4/2015 | Bantel | H01M 50/516 219/56.22 |
| 2015/0262731 | A1* | 9/2015 | Lee | H01B 1/04 174/118 |
| 2018/0309009 | A1* | 10/2018 | Henning | H10F 19/906 |
| 2019/0066882 | A1* | 2/2019 | Adams | H01B 13/0003 |
| 2019/0292671 | A1 | 9/2019 | Zhamu et al. | |
| 2020/0161821 | A1* | 5/2020 | Kawai | H01R 43/048 |
| 2020/0295427 | A1* | 9/2020 | Bayes | C23C 28/322 |
| 2020/0381765 | A1* | 12/2020 | Yang | H01M 50/566 |
| 2022/0199280 | A1* | 6/2022 | Lekarski | H01B 1/026 |
| 2022/0328938 | A1* | 10/2022 | Chen | B23K 20/10 |
| 2023/0100524 | A1* | 3/2023 | Ikeda | H01M 10/425 429/7 |
| 2023/0163424 | A1* | 5/2023 | Toshioka | H01G 11/10 429/163 |
| 2023/0282388 | A1* | 9/2023 | Kashani | B82Y 30/00 174/126.1 |
| 2023/0318149 | A1* | 10/2023 | Wang | H01M 50/213 429/158 |
| 2024/0052491 | A1* | 2/2024 | Pei | C23C 16/545 |
| 2024/0222813 | A1* | 7/2024 | Zhai | H01M 50/536 |
| 2024/0242900 | A1* | 7/2024 | Andersson | H01H 1/021 |
| 2024/0326170 | A1* | 10/2024 | Wang | B23K 26/0604 |
| 2025/0158467 | A1* | 5/2025 | Liu | H01B 1/026 |
| 2025/0205820 | A1* | 6/2025 | Liu | B23K 26/0608 |

FOREIGN PATENT DOCUMENTS

| | | | | | |
|---|---|---|---|---|---|
| CN | 112769270 | A | | 5/2021 | |
| CN | 113708533 | A | | 11/2021 | |
| CN | 115565729 | A | * | 1/2023 | H01B 11/00 |
| CN | 219371278 | U | * | 7/2023 | Y02E 60/10 |
| DE | 102013204362 | A1 | * | 9/2014 | H01M 50/516 |
| DE | 102016202071 | A1 | | 8/2017 | |
| KR | 20230126920 | A | * | 8/2023 | H01M 50/284 |
| WO | 2023216411 | A1 | | 11/2023 | |

OTHER PUBLICATIONS

Hidalgo-Manrique, et al. "Copper/graphene composites: a review," J Mater Sci, 2019, pp. 12236-12289, vol. 54.

* cited by examiner

METHODS OF JOINING MULTILAYER COPPER-GRAPHENE COATED CURRENT COLLECTORS TO BATTERY CANS AND BETWEEN WINDINGS IN ELECTRIC MOTOR STATORS

INTRODUCTION

Electric and hybrid electric vehicle technology has been enabled by the development and deployment of rechargeable, secondary batteries which provide energy to electric traction motors, servo motors, and other electronics in the vehicle. Numerous electrical connections and electrical components are provided to transfer energy between the battery, motor, and electrical components in the vehicle. For example, traction motors include a stationary stator and a rotor rotatably positioned within the stator. The stator may include windings of coiled wire wrapped around teeth in the stator. When the stator is energized with an alternating electrical current (AC), the windings create magnetic fields and permanent magnets in the rotor try to align with the magnetic fields causing the rotor to rotate within the stator. The windings are coupled to bus bars and the bus bars are then coupled to additional components in the power distribution system.

However, in alternating electric current (AC) power distribution, current density tends to be larger near the surface of conductors, such as the windings and busbars of the stator, and decreases approaching the core of the conductors. This effectively decreases the cross-section of the larger conductors and increases effective resistance. This effect, known as the skin effect, increases as the frequency of the alternating current increases. To combat this effect, several smaller conductors may be used to replace a large conductor. Each of the smaller conductors have a smaller cross-sectional area than the large conductor, but together may exhibit a cross-sectional area similar to the large conductor. In addition, coatings and other composite materials have been and are being developed to address and leverage the skin effect.

While present conductors in vehicles achieve their intended purpose, there is a need for new and improved conductors and methods of joining the conductors to other conductors and electrical components in the propulsion system as well as for other applications.

SUMMARY

According to several aspects, the present disclosure relates to an electrical connection for a vehicle. The electrical connection includes a first electrical component including a first joining area. The electrical connection also includes a conductor including a second joining area. The conductor is joined at the second joining area to the first joining area of the first electrical component. In addition, the electrical connection includes a fusion zone formed in the first electrical component in the first joining area. The conductor includes a substrate including a first surface, and a copper-graphene multilayer composite formed on the first surface. The copper-graphene multilayer composite includes at least one of the following composite structures: a) alternating layers of graphene and copper deposited on the substrate, b) graphene particles dispersed in a copper matrix, and c) alternating layers of graphene and copper deposited on a copper foil, wherein the copper foil is wrapped around the substrate.

In embodiments of the above, the substrate comprises at least one material selected from the group consisting of copper, steel, and aluminum.

In any of the above embodiments, the electrical connection further includes a fusion zone formed in the first electrical component in the first joining area.

In any of the above embodiments, further including graphene present in the fusion zone of the first electrical component. In further embodiments, a layer of nickel is present between the first joining area and the second joining area and nickel is present in the fusion zone of the first electrical component. Alternatively, the copper-graphene multilayer composite is not present on the first surface at the second joining area.

In any of the above embodiments, an electrically conductive adhesive contacts the first joining area of the first electrical component and the second joining area of the conductor. In further embodiments, the conductive adhesive is at least one of an electrically conductive glue and an electrically conductive adhesive tape.

In any of the above embodiments, the first electrical component is a winding in a stator and the conductor is a busbar. Alternatively, in any of the above embodiments, the first electrical component is a battery and the battery includes the first joining area formed of at least one of a tab and a terminal.

According to additional aspects, the present disclosure is directed to a method of forming an electrical connection for a vehicle. The method includes joining a first electrical component including a first joining area to a conductor including a second joining area. The conductor includes a substrate including a first surface and a copper-graphene multilayer composite formed on the first surface. The method further includes forming a fusion zone between the first electrical component in the first joining area and the conductor in the second joining area. The copper-graphene multilayer composite includes at least one of the following composite structures: a) alternating layers of graphene and copper deposited on the substrate, b) graphene particles dispersed in a copper matrix, and c) alternating layers of graphene and copper deposited on a copper foil, wherein the copper foil is wrapped around the substrate.

In embodiments of the above, joining comprises laser welding. Alternatively, joining is performed by at least one of the following welding processes: ultrasonic welding and friction welding.

In any embodiments of the above, graphene is present in the first electrical component in the fusion zone. In further embodiments, the method further includes supplying nickel in the form of foil between the first joining area and the second joining area prior to joining and nickel is present in the first electrical component in the fusion zone. In alternative or additional embodiments, the method further includes supplying nickel in the form of a wire, which is fed between the first joining area and the second joining area. Nickel is present in the first electrical component in the fusion zone. Alternatively, the method further includes removing a portion of the copper-graphene multilayer composite from the first surface at the second joining area before joining the first electrical component to the conductor, wherein the laser power during removing is less than the laser power during joining.

In any of the above embodiments, the first electrical component includes a secondary battery, wherein the secondary battery is a pouch battery including a tab and the first joining area is located on the tab. Alternatively or additionally, in any of the above embodiments, the first electrical component includes a secondary battery, wherein the secondary battery is a cylindrical battery including a terminal and the first joining area is located at the terminal.

In any of the above embodiments, the method includes joining the first electrical component including a steel terminal and the first joining area on the steel terminal to the second joining area of the conductor. The first electrical component is a secondary a battery, and the conductor is formed of copper. The method further includes forming the first fusion zone in the first electrical component in the first joining area, joining a second electrical component including a fourth joining area to a third joining area of the conductor, and forming a second fusion zone in the second electrical component in the fourth joining area. Alternatively, in any of the above embodiments, the method includes joining the first electrical component to a conductor formed of copper. The first electrical component being a winding, the winding providing the first joining area, and the conductor being a busbar, the busbar providing the second joining area.

According to yet additional aspects, the present disclosure relates to a method of joining an electrical component for a vehicle. The method includes applying a layer of adhesive to a first joining area of a first electrical component and applying the layer of adhesive to a second joining area of a conductor, wherein the conductor includes a substrate including a first surface and a copper-graphene multilayer composite on the first surface. The method also includes joining the first electrical component to the conductor, wherein the layer of adhesive comprises at least one of an electrically conductive glue and an electrically conductive adhesive tape. The copper-graphene multilayer composite includes at least one of the following composite structures: a) alternating layers of graphene and copper deposited on the substrate, b) graphene particles dispersed in a copper matrix, and c) alternating layers of graphene and copper deposited on a copper foil, wherein the copper foil is wrapped around the substrate.

BRIEF DESCRIPTION OF DRAWINGS

The drawings described herein are for illustration purposes only and are not intended to limit the scope of the present disclosure in any way.

DETAILED DESCRIPTION

Figure 1:
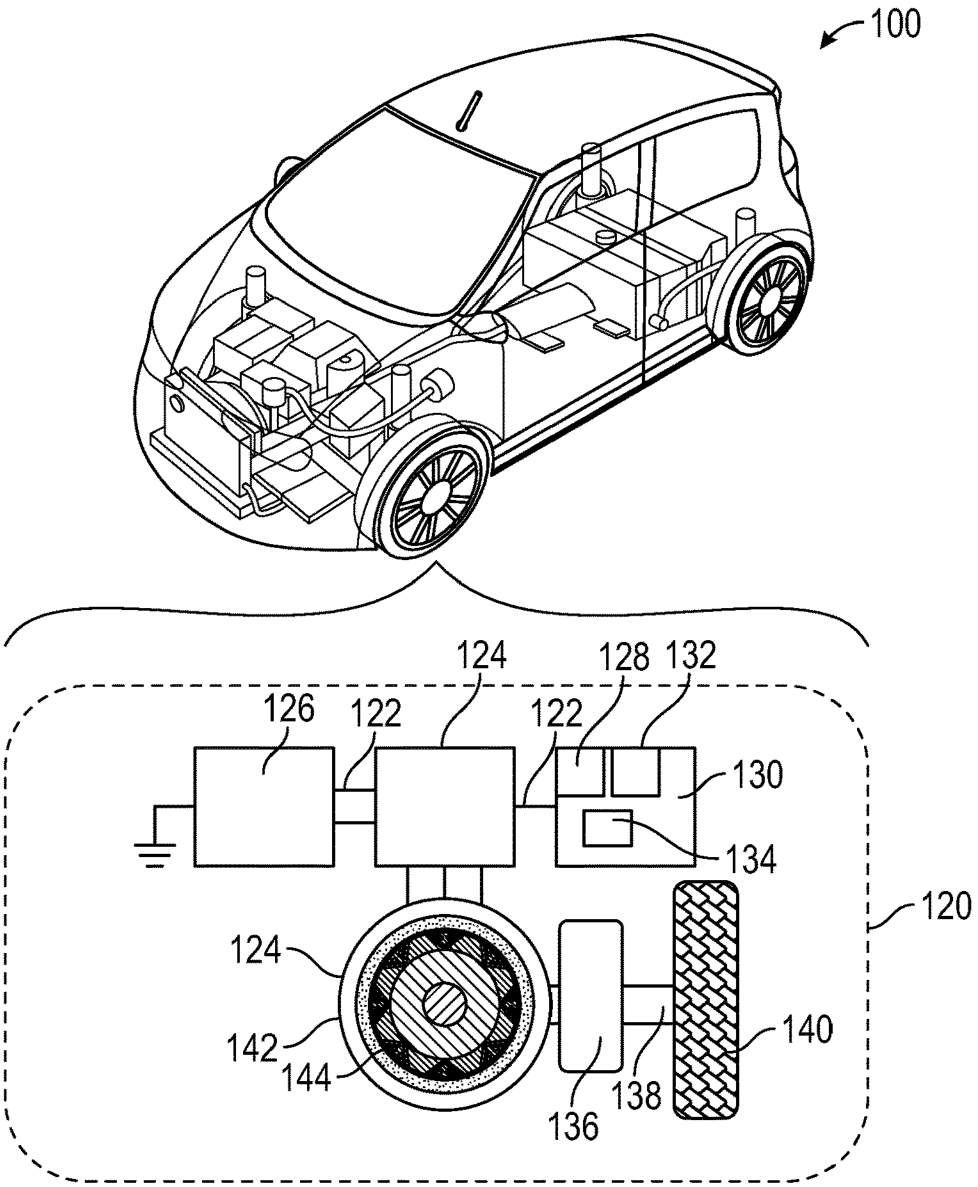
FIG. 1 illustrates a vehicle including a propulsion system utilizing an electric traction motor according to various embodiments of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

The present disclosure relates to electrical connections and methods of forming electrical connections and electric circuits in energy storage and propulsion systems of a vehicle, including in the battery module and the electric motor.

As used herein, the term "vehicle" is not limited to automobiles. While the present technology is described primarily herein in connection with electric vehicles, the technology is not limited to electric vehicles, but hybrid electric vehicles and internal combustion engines as well. In addition, the concepts can be used in a wide variety of applications, such as in connection with components used in motorcycles, mopeds, locomotives, aircraft, marine craft, and other vehicles, as well as in other applications utilizing electrical connections, such as in portable power stations, such as those used for powering remote job sites and emergency back-up power supplies, and permanent power stations associated with buildings and equipment, all of which may be powered by, for example, solar or wind-powered generator systems, power mains, and fuel based power generators such as gasoline or diesel generators as well as sterling engines.

FIG. 1 illustrates a vehicle 100 including an energy storage and propulsion system 120. The energy storage and propulsion system 120 includes a number of electrical components forming electric circuits, (i.e., components that either generate, transmit, or alter power), used to propel the vehicle 100, such as the battery, electric motor, power electronics module, and devices in the power electronics module, and electrical conductors connecting the electrical components together or present in electrical components, etc., as described further herein.

As alluded to above, the energy storage and propulsion system 120 generally includes an electric motor 124 and a secondary battery 126 for powering the electric motor 124. Further, in many embodiments, the propulsion system 120 includes an inverter 128 for changing power from DC (direct current) as provided by the battery 126 to AC (alternating current) as it is used by the electric motor 124. The inverter 128 may be included in a power electronics module 130, which includes e.g., transistors and diodes, for switching the power from DC to AC and vice-versa. In embodiments, the battery 126 is connected to the electric motor 124 through the power electronics module 130.

A controller 132, which may also be included in the power electronics module 130 or otherwise connected to the power electronics module 130, is connected to the inverter 128 and is programmed to control and manage the operations of the electric motor 124 and associated hardware, including the inverter 128. The electric motor 124 is connected to a transmission (drive unit) 136, and drive line 138, which transfers mechanical power and rotation to the wheels 140 of the vehicle 100. The controller 132 includes one or more one or more processors and tangible, non-transitory memory 134.

With reference again to the electric motor 124, the electric motor 124, powered by the battery 126, includes a stator 142 and a rotor 144 arranged in a rotatable manner within the stator 142. The stator 142 is the stationary part of the electric motor 124. When energized with an alternating current (AC), the stator 142 provides a rotating magnetic field with which the stationary magnetic field of the rotor 144 tries to align with, causing the rotor 144 to rotate, in what may be referred to as "motoring" mode. In traction electric vehicle applications, the motoring mode provides propulsion to the vehicle 100. In other applications, the rotor's 144 rotating field (as caused by physical rotation) generates an electric current in the stator 142—this mode of operation is referred to as "generation" and the electric motor 124 used in this way is used as a generator. Generation mode takes some of the energy recovered from braking, e.g., when the vehicle is in the process of slowing and stopping and stores it back in the battery 126.

Figure 2A:
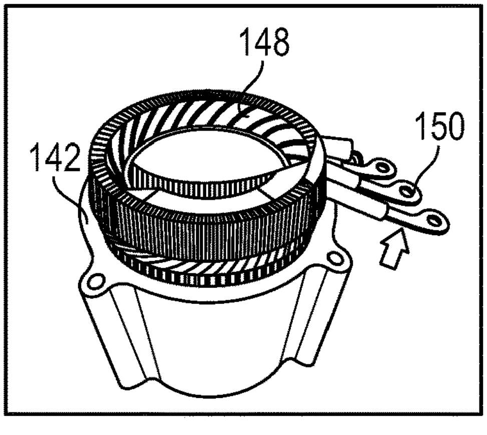
FIG. 2A illustrates a traction motor stator according to various embodiments of the present disclosure.
Figure 2B:
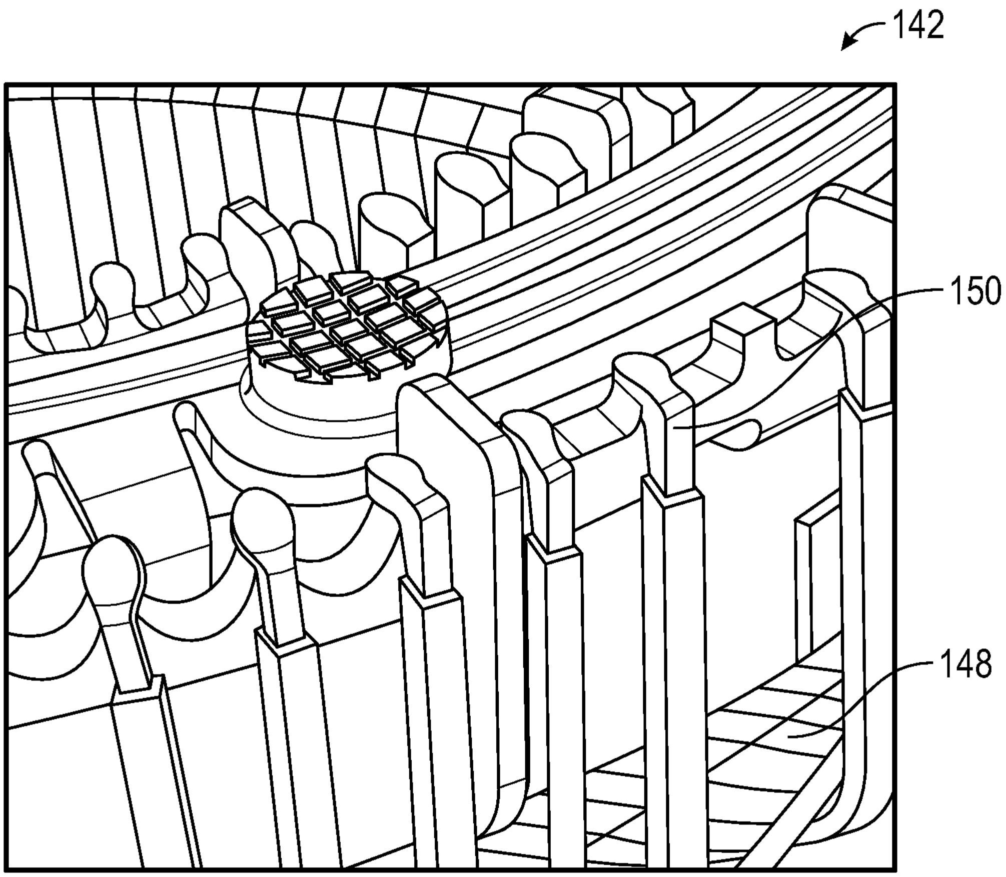
FIG. 2B illustrates windings in an electric motor coupled to a busbar according to various embodiments of the present disclosure.

Reference is made to FIGS. 2A and 2B illustrating an embodiment of an electrical component and specifically a stator 142. The stator 142 may generally include a plurality of wire windings 148 formed from one or more conductors, described further herein. The wire windings 148 are also connected to one or more busbars 150, which connect the wire windings 148 to the inverter 128 in the power electronics module 130 and battery 126 as illustrated in FIG. 1, either directly or indirectly through additional conductors 122.

Figure 3A:
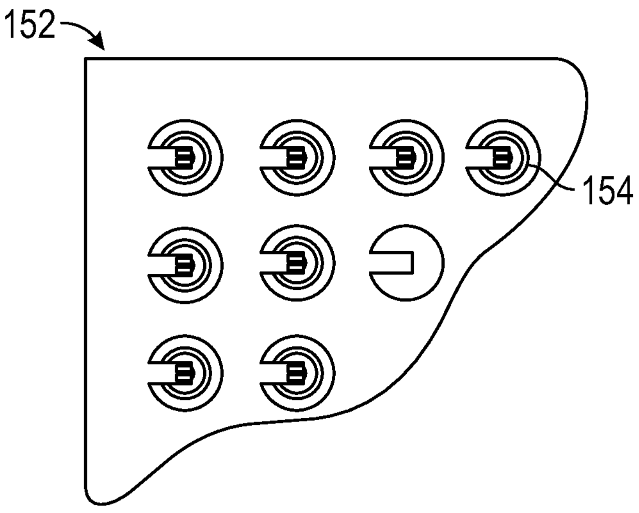
FIG. 3A illustrates a top down view of a plurality of battery cells in a battery pack, wherein each battery cell includes a current collector according to various embodiments of the present disclosure.
Figure 3B:
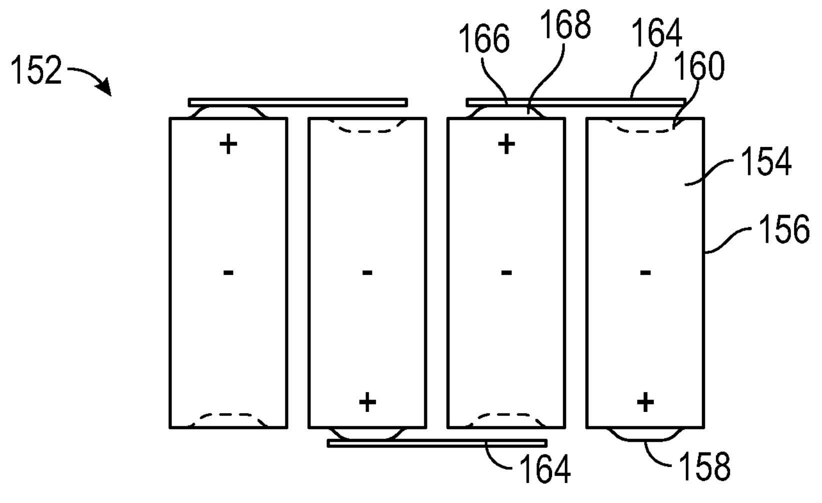
FIG. 3B illustrates a plurality of current collectors coupled to cylindrical type secondary batteries.

FIGS. 3A and 3B illustrate another embodiment of an electrical component and specifically secondary batteries 154 arranged in an array 152. As illustrated, the secondary batteries 154 are cylindrical batteries. Secondary batteries are understood herein as batteries that are rechargeable. That is, the secondary batteries may store a charge, discharge the charge, and may be recharged to again store a charge. The secondary batteries 154 may include, for example, lithium ion batteries and nickel-metal-hydride batteries. The illustrated secondary batteries 154 are cylindrical batteries and include a battery can 156 housing the anode, anode current collector, cathode, cathode current collector, separator, and electrolyte that are rolled within the battery can 156. The battery can 156 includes a positive terminal 158 connected to the cathode current collector and a negative terminal 160 connected to the anode current collector. In embodiments, the battery can 156 includes steel or aluminum and the positive terminal 158 and negative terminal 160 include one or more of steel, aluminum, and copper. Conductors 164 are used to connect the battery cans 154 in the array 152 together and to additional components in the energy storage and propulsion system 120.

Figure 4A:
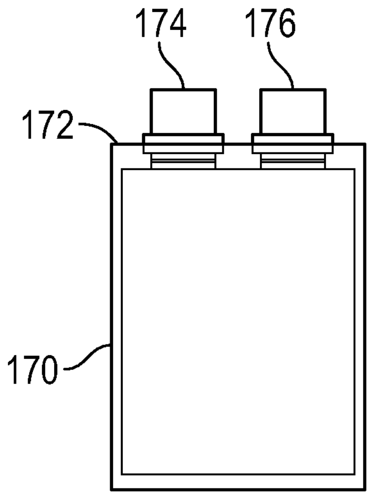
FIG. 4A illustrates a battery pouch including a conductor tab, according to various embodiments of the present disclosure.
Figure 4B:
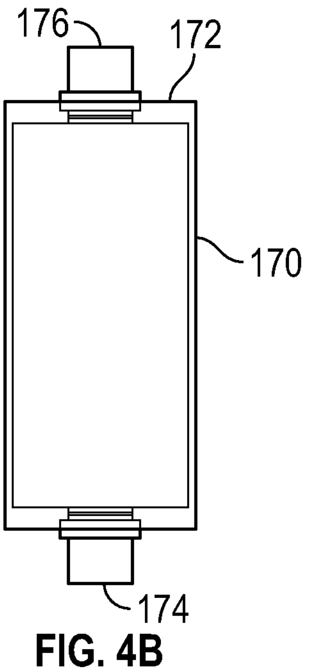
FIG. 4B illustrates a battery pouch including a conductor tab, according to various embodiments of the present disclosure.

FIGS. 4A and 4B illustrate another embodiment of an electrical component and specifically another embodiment of secondary batteries 170. As illustrated, the secondary batteries 170 are pouch style batteries. The pouch style secondary batteries 170 may also include, for example, lithium ion batteries and nickel-metal-hydride batteries. The pouch style batteries 170 include a pouch 172 housing the anode, anode current collector, cathode, cathode current collector, separator, and electrolyte. Extending from the same end of the pouch 172 or from either ends of the pouch 172 are tabs 174, 176, coupled to the cathode current collector and anode current collector located in the battery 170. The tabs 174, 176 are formed from one or more of steel, aluminum, and copper. Conductors (not illustrated) are used to connect multiple pouches together, such as in the battery array illustrated in FIG. 3A, and to additional electrical components in the energy storage and propulsion system 120.

Figure 5A:
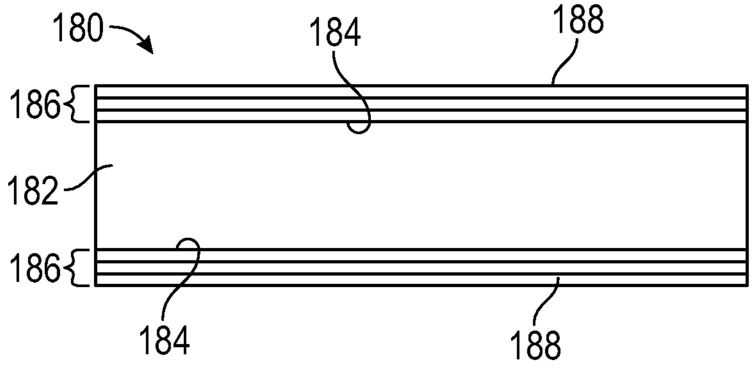
FIG. 5A illustrates a cross-sectional view along the axis of a conductor according to various embodiments of the present disclosure.
Figure 5B:
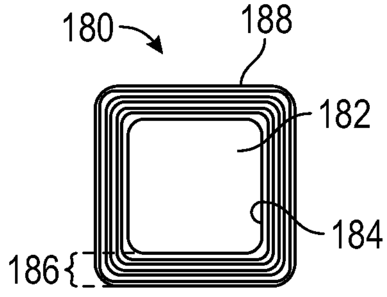
FIG. 5B illustrates a cross-sectional view perpendicular to the axis of the conductor of FIG. 5A according to various embodiments of the present disclosure.

In embodiments, the conductors 122, 148, 164 (generally referred to as conductor 180) are formed from composites, an embodiment of which is illustrated in FIGS. 5A and 5B. The conductors 180, include a substrate 182 such as a wire, a foil, or a trace deposited on a carrier. In embodiments, the substrate 182 is copper. Alternatively, the substrate 182 may be any material formed of an electrically conductive material exhibiting a conductivity of at least 1×10^7 Siemens per meter (S/m) at 20 degrees Celsius, such as in the range of 1×10^7 S/m at 20 degrees Celsius to 6.3×10^7 S/m at 20 degrees Celsius. Accordingly, in alternative embodiments, the conductors include at least one or more of the following: steel, aluminum, aluminum alloys and copper alloys. The substrate 182 may exhibit a thickness, or diameter, in the range of 0.01 millimeters to 10 millimeters, including all values and ranges therein such as 0.5 millimeters to 5 millimeters. Further, the substrate 182 may exhibit any number of cross-sections including square (as illustrated in FIG. 5B), hexagonal, rectangular, oval, elliptical, pentagonal, etc.

The substrate includes a surface 184, including a copper-graphene multilayer composite 186 formed on the surface 184. In embodiments, the copper-graphene multilayer composite 186 exhibits an electrical conductivity in the range of 105% to 400% of the International Annealed Copper Standard (IACS), including all values and ranges therein. The International Annealed Copper Standard (IACS) is understood as the percentage of conductivity a material has relative to copper, which is considered 100 percent conductive and references a copper having a resistivity of 1.7241 microohm-centimeters at 20 degrees Celsius. The copper-graphene multilayer composite exhibits a number of composite structures. In embodiments, the copper-graphene multilayer composite 186 includes one or more alternating layers of copper and graphene deposited on the substrate 182. In such embodiments, graphene is first deposited on each substrate 182 and then copper is deposited over the graphene, and the process is repeated until the desired number of layers are present. In additional or alternative embodiments, graphene particles are dispersed between a plurality of coated copper layers. In yet further embodiments of the above, the copper and graphene may be deposited, either as alternating layers of the copper and graphene or with graphene particles in a copper matrix, onto a copper foil that may then be wrapped around the substrate 182. The copper-graphene multilayer composite of any of the above embodiments, may be applied directly to a substrate 182 or to a copper foil, which is wrapped on a substrate 182, using one of several techniques such as electrochemical deposition, electrodeposition, physical vapor deposition, chemical vapor deposition, and layer by layer assembly. The copper-graphene multilayer composites 186 may exhibit a thickness in the range of 5 nanometers to 500 micrometers, including all values and ranges therein such as in the range of 30 micrometers to 300 micrometers. When foil is present, the foil exhibits a thickness in the range of 5 micrometers to 25 micrometers, including all values and ranges therein, in addition to the remaining copper-graphene multilayer composite.

Figure 6:
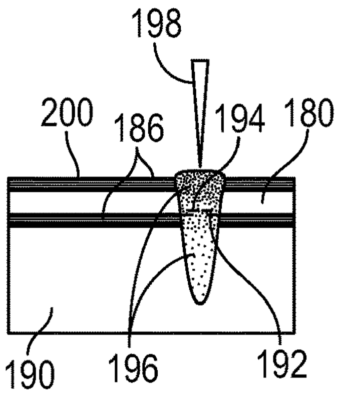
FIG. 6 illustrates a copper conductor including a composite copper-graphene multilayer composite coating welded to a first electrical component, according to various embodiments of the present disclosure.

The conductors 180 are joined to one or more electrical components, such as to other conductors as illustrated in FIG. 6 described further herein, the battery 126, including to connect the individual battery cells 154, 170 together, the electric motor 124, including the individual windings 148 and busbar 150 coupled to the windings 148 in the stator 142, the inverter 128, the power electronics module 130, including the components therein such as the controller 132 and the non-transitory memory 134, as well as to other electronic components present in the energy storage and propulsion system 120 of the vehicle 100. The conductors 180 and electrical components are joined at joining areas present on both the conductors 180 and the electrical components.

Figure 8A:
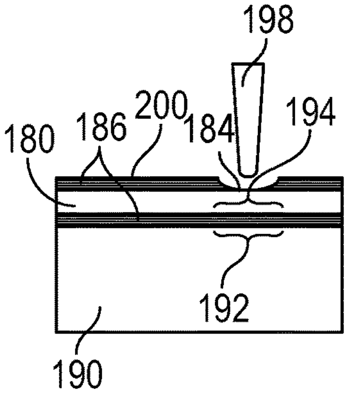
FIG. 8A illustrates the copper conductor including a composite copper-graphene multilayer composite coating welded to a target wherein a portion of the coating is removed prior to welding, according to various embodiments of the present disclosure.
Figure 8B:
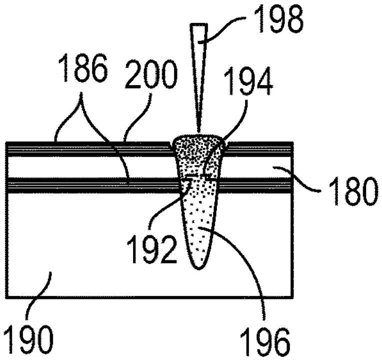
FIG. 8B illustrates the copper conductor including a composite copper-graphene multilayer composite coating welded to the target of FIG. 8A, according to various embodiments of the present disclosure.

For example, reference is made to FIG. 6, which illustrates an embodiment of a conductor 180 joined to a first electrical component 190. The conductor 180 includes a joining area 192 and the electrical component 190 includes a joining area 194. Accordingly, as understood herein the joining area is a region on the surface of the conductor 180 or the electrical component 190 where the conductor 180 and the electrical component 190 are joined together. For example, joining areas 194 may be present on the busbar 150 of the stator 142, on the positive terminal 158 or the negative terminal 160 of the cylindrical battery 154, or on the tabs 174, 176 of the pouch battery. A fusion zone 196 is formed in the joining areas 192, 194. In embodiments, as illustrated in FIG. 6, the fusion zone 196 extends into and, in embodiments, under the surface of the electrical component 190 and through the conductor 180. When utilizing welding processes as described further herein, the fusion zone(s) 196 may include materials present in the joining area 192 of the conductor 180 and joining area 194 of the electrical component 190, such as the material forming the substrate 182 of the conductor 180, the copper-graphene multilayer composite 186 formed on the surface of the conductor 180, and the material from the first electrical component 190. These materials may be mixed into and, in embodiments, under the surface of one or both of the joining areas 192, 194 in the fusion zone 196. Alternatively, the fusion zone 196 may extend only into the surface of the electrical component 190 or only into the surface of the conductor 180; or the fusion zone 196 may remain at the surfaces of the electrical component 190 and the conductor 180 as illustrated in FIG. 8 discussed further herein.

In embodiments, the conductors 180 and the electrical components 190 are joined by a welding process, such as a laser welding process, a friction welding process, or an ultrasonic welding process. Laser welding processes include processes that utilize a laser beam to melt and join the joining areas together. Friction welding processes utilize the generation of friction to melt and join the joining areas together and include processes such as friction stir welding, rotary friction welding, and linear friction welding. Ultrasonic welding utilizes a process that utilizes local, high frequency ultrasonic vibrations.

FIG. 6 illustrates an example of a welding process wherein a first electrical component 190 includes a first joining area 192 which is joined to a second joining area 194 of the conductor 180. A laser is used to weld the conductor 180 to the first electrical component 190. The laser beam 198 is incident on a surface 200 that opposes the second joining area 194 and the laser beam energy penetrates through the conductor 180 into the electrical component 190, forming a fusion zone 196 in the conductor 180 and the electrical component 190. In embodiments, a portion of the conductor 180, including copper and graphene from the copper-graphene multilayer composite, becomes dispersed into the fusion zone 196 in the electrical component 190 as noted above.

Figure 7A:
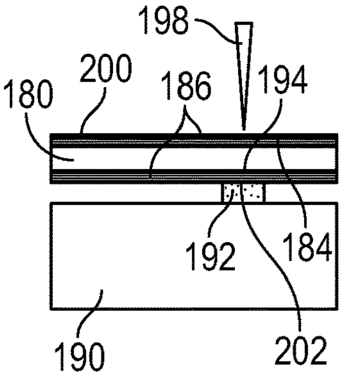
FIG. 7A illustrates a copper conductor including a composite copper-graphene coating disposed next to a conductor including a nickel foil positioned between the composite copper-graphene coating and the target, according to various embodiments of the present disclosure.
Figure 7B:
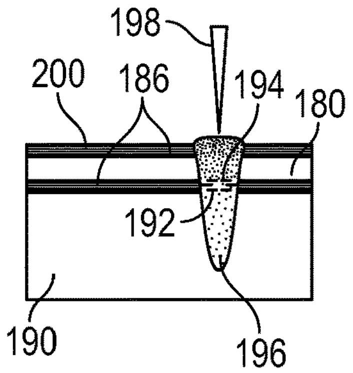
FIG. 7B illustrates the copper conductor including a composite copper-graphene multilayer composite coating welded to a target, according to various embodiments of the present disclosure.

However, in embodiments, graphene may be deleterious to the joint formed between the conductor 180 and electrical component 190. Thus, without being bound to any particular theory, the wettability of the graphene may be adjusted through the addition of nickel to the weld joint. As illustrated in FIGS. 7A and 7B, a nickel foil 202 is inserted between the between the first joining area 192 and the second joining area 194. A laser is then used to weld the conductor 180 to the first electrical component 190. The laser beam 198 is incident on a surface 200 that opposes the second joining area 194 and the laser beam energy penetrates through the conductor 180 into the electrical component 190, forming a fusion zone 196 in the conductor 180 and the electrical component 190. In embodiments, a portion of the conductor 180, including copper and graphene from the copper-graphene multilayer composite, and the nickel foil 202 becomes dispersed into the fusion zone 196 in the electrical component 190. As an alternative to the nickel foil 202 a nickel wire may be fed between the first joining area 192 and the second joining area 194, particularly in embodiments where the first joining area 192 and the second joining area 194 exhibit larger joining area geometries.

Alternatively, or additionally, to the embodiment illustrated in FIGS. 7A and 7B, FIGS. 8A and 8B illustrate a method wherein a portion of the copper-graphene multilayer composite 186 located on a first surface opposing the second joining area 194 is removed prior to joining. A short, pulsed laser or a defocused laser beam, exhibiting lower power at the incident surface 200 than the power used to weld the conductor 180 and electrical component 190 together, is used to ablate the copper-graphene multilayer composite 186 from the surface 200 opposing the second joining area 194. Once the copper-graphene multilayer composite 186 is ablated from the opposing surface 200 to the second joining area 194, the laser beam 198 is applied at a higher power and incident on the conductor surface 184. The laser beam energy penetrates through the conductor 180 into the electrical component 190, forming a fusion zone 196 in the conductor 180 and the electrical component 190. In embodiments, a portion of the conductor 180, including copper and graphene from the copper-graphene multilayer composite in the second joining area 194, becomes dispersed into the fusion zone 196 in the electrical component 190. In further embodiments, the copper-graphene multilayer composite 186 is also removed from the second joining area 194.

While the above processes are illustrated as being performed with a laser, it may be appreciated that joining the conductor 180 to the electrical component 190 may be performed using other processes described above. Further, ablation of the copper-graphene multilayer composite may be performed using an alternative process such as an etching process or a sanding process.

Figure 9:
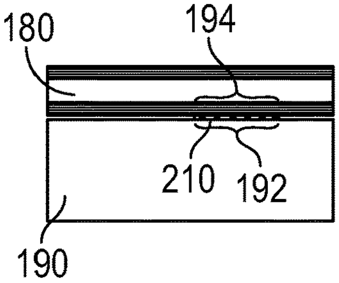
FIG. 9 illustrates the copper conductor including a composite copper-graphene multilayer composite coating adhered to a target, according to various embodiments of the present disclosure.

FIG. 9 illustrates yet another embodiment of joining an electrical component 190 to a conductor 180 utilizing an electrically conductive adhesive 210, which is applied to the joining area 192 of the conductor 180 and the joining area 194 of the electrical component 190. In embodiments, the electrically conductive adhesive 210 exhibits a conductivity of at least 1×10^6 Siemens per meter (S/m) at 20 degrees Celsius, such as in the range of 1×10^7 S/m at 20 degrees Celsius to 6.3×10^7 S/m at 20 degrees Celsius. The electrically conductive adhesive includes at least one of an electrically conductive glue or an electrically conductive adhesive tape, such as a double sided electrically conductive adhesive tape. The electrically conductive adhesive 210 conducts current through the thickness of the electrically conductive adhesive 210. The electrically conductive adhesive 210 creates a fusion zone 196 at the first joining surface 192 and the second joining surface 194.

Figure 10:
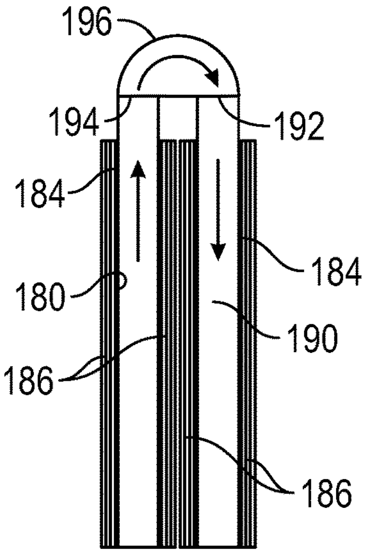
FIG. 10 illustrates direct welding of two copper conductors including a composite copper-graphene multilayer composite coating welded together, according to various embodiments of the present disclosure.

FIG. 10 illustrates yet another embodiment of direct welding of two conductors 180, 190 together. The end of each conductor 180, 190 forms a first joining area 192 and a second joining area 194, respectively. Upon welding the two conductors 180, 190 together a fusion zone 196 is formed between the conductors 180, 190. As illustrated, the copper-graphene multilayer composite 186 is removed from the first joining area 192 and the second joining area 194. In alternative embodiments, the copper-graphene multilayer composite 186 is kept on the surface 184 of the conductors 180, 190 and nickel foil or a nickel wire is positioned between the first joining area 192 and the second joining area 194.

Figure 11:
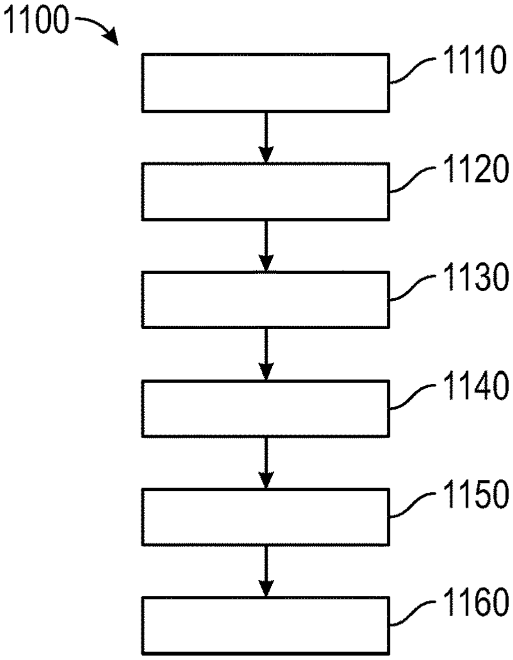
FIG. 11 illustrates a schematic of a welding process according to various embodiments of the present disclosure.

FIG. 11 illustrates a general method of forming an electrical connection in an electric motor or forming an electric circuit in the electric motor. The method 1100 includes at block 1110 joining the conductor 180 at a joining area 194 to a joining area of the first electrical component 190. At block 1120 at least a portion of the copper-graphene multilayer composite material 186 is optionally removed from at least one surface 184 of the conductor 180, usually on a surface opposing the joining area 194 of the conductor 180. At block 1130 a fusion zone is created at the joining area 192 of the electrical component 190 and the conductor 180. If the conductor 180 is to be joined to a second component, such as additional battery cells 154, 170, or additional conductors 190, then the process is repeated and the conductor 180 is joined at an additional joining area to a joining area of the second component at block 1140. At block 1150, copper-graphene multilayer composite material 186 is optionally removed from at least one surface of the conductor 180, usually on a surface opposing the additional joining area of the conductor 180. At block 1160 a fusion zone 196 is then formed between the conductor 180 and the second electrical component 190.

The connections between conductors including copper-graphene multilayer composite coatings and target conductors provides a number of advantages. Such advantages include enabling the provision of conductors including composite coatings for leveraging the skin effect. Another advantage, of welding, is the provision of a method to join the copper-graphene multilayer coating with a target, such as a battery steel can. While the ordered structure of the graphene layer may be interrupted in the fusion zone, the composite is still relatively high in conductivity. Further, the use of nickel provides an additional advantage of increasing the wettability of the graphene in the fusion zone. If maintenance of the ordered structure of the graphene in the copper-graphene multilayer composite, then an additive method of joining the coated conductor and target may be used. Further, defocus beam burning and welding may also advantageously reduce graphene imperfections.

As used herein, the term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component (s) in the form of memory and storage devices (read only, programmable read only, random access, hard drive, etc.). The controller 132 may also consist of multiple controllers which are in electrical communication with each other. The controller 132 may be inter-connected with additional systems and/or controllers of the vehicle 100, allowing the controller 132 to access data such as, for example, speed, acceleration, braking, and steering angle of the vehicle 100.

A processor may be a custom made or commercially available processor, a central processing unit (CPU), a graphics processing unit (GPU), an auxiliary processor among several processors associated with the controller 132, a semiconductor-based microprocessor (in the form of a microchip or chip set), a macro processor, a combination thereof, or generally a device for executing instructions.

The tangible, non-transitory memory 134 may include volatile and nonvolatile storage in read-only memory (ROM), random-access memory (RAM), and keep-alive memory (KAM), for example. KAM is a persistent or non-volatile memory that may be used to store various operating variables while the processor is powered down. The tangible, non-transitory memory 134 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 132 to control various systems of the vehicle 100.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electrical connection for a vehicle, comprising:
a first electrical component including a first joining area;
a conductor including a second joining area, the conductor joined at the second joining area to the first joining area of the first electrical component, wherein the conductor includes a substrate including a first surface, and a copper-graphene multilayer composite formed on the first surface, wherein the copper-graphene multilayer composite includes at least one of the following composite structures: a) alternating layers of graphene and copper deposited on the substrate, b) graphene particles dispersed in a copper matrix, and c) alternating layers of graphene and copper deposited on a copper foil, wherein the copper foil is wrapped around the substrate; and
a fusion zone formed in the first and second joining area, wherein the copper-graphene multilayer composite is not present on the first surface at the second joining area.

2. The electrical connection of claim 1, wherein the substrate comprises at least one material selected from the group consisting of copper, steel, and aluminum.

3. The electrical connection of claim 1, wherein the fusion zone is formed in the first electrical component in the first joining area.

4. The electrical connection of claim 3, further comprising graphene present in the fusion zone of the first electrical component.

5. The electrical connection of claim 4, further comprising a layer of nickel present between the first joining area and the second joining area and nickel present in the fusion zone of the first electrical component.

6. The electrical connection of claim 1, further comprising an electrically conductive adhesive contacting the first joining area of the first electrical component and the second joining area of the conductor, and wherein the conductive adhesive is at least one of an electrically conductive glue and an electrically conductive adhesive tape.

7. The electrical connection of claim 1, wherein the first electrical component is a winding in a stator and the conductor is a busbar.

8. The electrical connection of claim 1, wherein the first electrical component is a battery and the battery includes the first joining area provided by at least one of a tab and a terminal.

9. The electrical connection of claim 1, wherein the copper-graphene multilayer composite exhibits a thickness in the range of 5 nanometers to 500 micrometers.

10. The electrical connection of claim 1, wherein the substrate exhibits a thickness in the range of 0.01 millimeters to 10 millimeters.

11. A method of forming an electrical connection for a vehicle, comprising:
joining a first electrical component including a first joining area to a conductor including a second joining area, wherein the conductor includes a substrate including a first surface, and a copper-graphene multilayer composite formed on the first surface;
forming a fusion zone between the first electrical component in the first joining area and the conductor in the second joining area; and
removing a portion of the copper-graphene multilayer composite from the first surface at the second joining area before joining the first electrical component to the conductor, wherein a laser power during removing is less than the laser power during joining,
wherein the copper-graphene multilayer composite includes at least one of the following composite structures: a) alternating layers of graphene and copper deposited on the substrate, b) graphene particles dispersed in a copper matrix, and c) alternating layers of graphene and copper deposited on a copper foil, wherein the copper foil is wrapped around the substrate.

12. The method of claim 11, wherein joining comprises laser welding.

13. The method of claim 11, wherein joining comprises at least one of the following welding processes: ultrasonic welding and friction welding.

14. The method of claim 11, wherein graphene is present in the first electrical component in the fusion zone.

15. The method of claim 14, further comprising supplying nickel in the form of foil between the first joining area and the second joining area prior to joining, wherein nickel is present in the first electrical component in the fusion zone.

16. The method of claim 14, further comprising supplying nickel in the form of a wire and fed between the first joining area and the second joining area, wherein nickel is present in the first electrical component in the fusion zone.

17. The method of claim 11, wherein the first electrical component includes a secondary battery, wherein the secondary battery includes at least one of a pouch battery including a tab and the first joining area is located at the tab, and a cylindrical battery, wherein the cylindrical battery includes a terminal and the first joining area is located at the terminal.

18. The method of claim 11, further comprising:
joining the first electrical component to the conductor, wherein the first electrical component is a winding in a stator, wherein the winding includes the first joining area, wherein the conductor includes a busbar and the busbar includes the second joining area;
forming the fusion zone in the first electrical component in the first joining area, wherein the fusion zone is a first fusion zone;
joining a second electrical component including a fourth joining area to a third joining area of the conductor; and
forming a second fusion zone in the second electrical component in the fourth joining area.

19. The method of claim 11, further comprising:
joining the first electrical component including a steel terminal and the first joining area on the steel terminal to the second joining area of the conductor, wherein the first electrical component is a secondary battery, and the substrate of the conductor is formed of copper;
forming the fusion zone in the first electrical component in the first joining area, wherein the fusion zone is a first fusion zone;
joining a second electrical component including a fourth joining area to a third joining area of the conductor; and
forming a second fusion zone in the second electrical component in the fourth joining area.

20. A method of joining an electrical component for a vehicle, comprising:
applying a layer of adhesive to a first joining area of a first electrical component;
applying the layer of adhesive to a second joining area of a conductor, wherein the conductor includes a substrate including a first surface and a copper-graphene multilayer composite on the first surface; and joining the first electrical component to the conductor, wherein the layer of adhesive comprises at least one of an electrically conductive glue and an electrically conductive adhesive tape, wherein the copper-graphene multilayer composite includes at least one of the following composite structures: a) graphene particles dispersed in a copper matrix deposited on a copper foil, wherein the copper foil is wrapped around the substrate, and b) alternating layers of graphene and copper deposited on a copper foil, wherein the graphene is deposited on the copper foil and copper is deposited on the graphene, wherein the copper foil is wrapped around the substrate.

* * * * *